United States Patent [19]
Hamaguchi

[11] Patent Number: 5,577,218
[45] Date of Patent: Nov. 19, 1996

[54] MEMORY ACCESS CONTROL METHOD WHEREIN BLOCK ACCESS IS PERFORMED AS A SEQUENTIAL ACCESS TO AN ADDRESS UPDATED BY INCREMENTATION

[75] Inventor: Kazumasa Hamaguchi, Kawasaki, Japan

[73] Assignee: Canon Kabushiki Kaisha, Tokyo, Japan

[21] Appl. No.: 428,799

[22] Filed: Apr. 24, 1995

Related U.S. Application Data

[63] Continuation of Ser. No. 851,920, Mar. 16, 1992, abandoned.

[30] Foreign Application Priority Data

Mar. 20, 1991 [JP] Japan ................... 3-081445

[51] Int. Cl.$^6$ ................... G06F 12/06
[52] U.S. Cl. ................... 395/405; 395/421.09; 395/454; 395/494; 365/239; 364/251; 364/251.7; 364/254.3; 364/957.1; 364/DIG. 1
[58] Field of Search ................... 395/421.07, 421.08, 395/421.09, 494, 843, 854, 855, 405, 454; 365/230.08, 230.09, 238.5, 239

[56] References Cited

U.S. PATENT DOCUMENTS

| | | | |
|---|---|---|---|
| 4,860,325 | 8/1989 | Aria et al. | 377/29 |
| 4,870,622 | 9/1989 | Aria et al. | 365/230.02 |
| 5,134,699 | 7/1992 | Aria et al. | 395/425 |
| 5,159,676 | 10/1992 | Wicklund et al. | 395/425 |
| 5,179,687 | 1/1993 | Hidaka et al. | 395/425 |

FOREIGN PATENT DOCUMENTS 0282248  9/1988  European Pat. Off. .

OTHER PUBLICATIONS

"Configurer Son Controleur De DRAM Pour Accroitre Les Performances", Electronique Industrielle, Dec. 11, 1989, No. 168, Paris, FR.

*Primary Examiner*—Frank J. Asta
*Attorney, Agent, or Firm*—Fitzpatrick, Cella, Harper & Scinto

[57] ABSTRACT

In a system having a memory unit using a memory for a block transfer function, access requested from a processor is executed by using the block transfer function even if the requested access is not block access to be conducted with respect to a block, provided that block transfer is possible.

6 Claims, 2 Drawing Sheets

MEMORY ACCESS CONTROL METHOD WHEREIN BLOCK ACCESS IS PERFORMED AS A SEQUENTIAL ACCESS TO AN ADDRESS UPDATED BY INCREMENTATION

This application is a continuation of applicaton Ser. No. 07/851,920, filed Mar. 16, 1992, now abandoned.

BACKGROUND OF THE INVENTION

1. Field of the Invention

This invention relates to an information processing system and, more particularly, to a system having a function of transferring data blocks from a memory unit to another unit according to an access request.

2. Description of the Prior Art

Many existing computer systems have dynamic random access memories (DRAMs) as a memory device. DRAMs have a large capacity but are comparatively low in access speed. To reduce the influence of this drawback upon a computer system, various means, e.g., using a cache memory, have been devised. A cache memory is a memory for storing data combined into blocks with addresses. Ordinarily, these blocks are controlled with respect to a unit corresponding to an integer multiple of an access band width of the memory. In the case of data loading in the cache memory from the DRAM when a mis-hit occurs, data blocks are transferred by continuously accessing data corresponding to an integer multiple of the memory access band. Under access control of a conventional memory controller, the operation of the block transfer function of the DRAM is executed at the time of such data block loading in the cache memory.

In this conventional system, however, the operation of the block transfer function of the DRAM is not executed unless a kind of access clearly stated as access to data with continuous addresses, i.e., a block access, is designated. Block access or ordinary access is determined according to whether the access target belongs to a cacheable address area or an uncacheable address area. Generally, data which needs to be accessed at a high speed is placed in a cacheable area while data which need not be accessed at a comparatively high speed is placed in an uncacheable area. There is a locality of address reference patterns in a program, which is called a locality of reference. This is true with respect to both cacheable and uncacheable areas. Presently, an increase in the speed of access to data belonging to a cacheable area is achieved by using a high-speed cache memory, but no speedup means has been provided for accessing data belonging to an uncacheable area.

SUMMARY OF THE INVENTION

An object of the present invention is to provide a memory access control method which enables high-speed service to a requested access.

Another object of the present invention is to provide a memory access control method which enables block transfer for access which is not stated as access to a data block.

According to one aspect, the present invention which achieves these objectives relates to a memory access control method comprising the steps of receiving address data of an access request, determining whether block access conducted as access to a data block is possible based on the received address data, and starting block access even if the requested access is not block access, provided that it is determined that block access is possible.

According to one aspect, the present invention which achieves these objectives relates to an information processing system comprising memory means for storing information;

reception means for receiving address data on requested access to the memory means, address memory means for storing the received address data received by the reception means, determination means for determining, based on the address data, whether block access to the memory means conducted as access to a data block is possible, and access control means for controlling the system so as to Start block access even if the requested access is not block access, provided that the determination means determines that block access is possible.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determinating the scope of the invention.

DESCRIPTION OF THE PREFERRED EMBODIMENT

An embodiment of the present invention will be described below with reference to the accompanying drawings.

Figure 1:
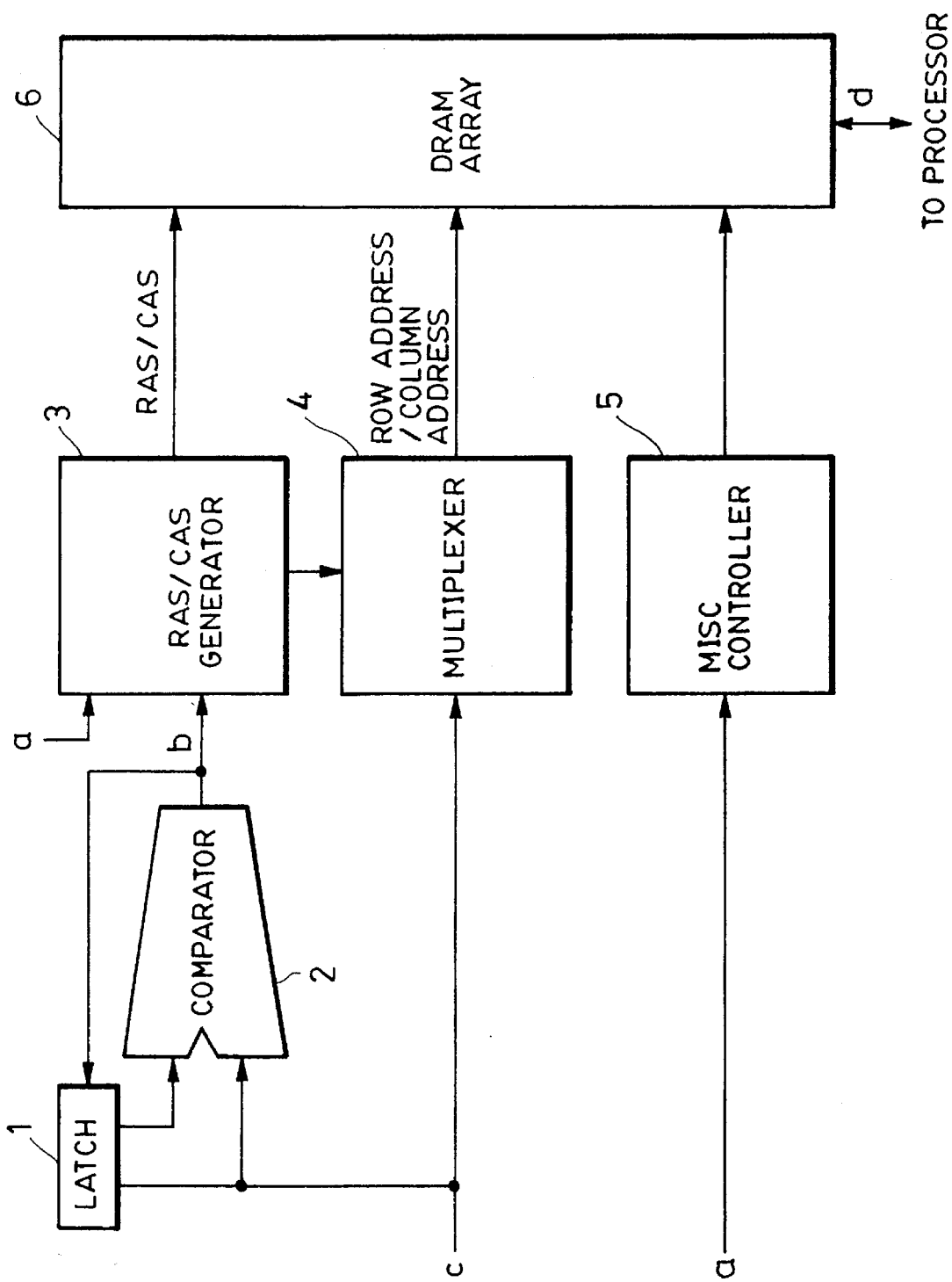
FIG. 1 is a block diagram of a memory access controller in accordance with an embodiment of the present invention.

Referring to FIG. 1, a memory access controller in accordance with an embodiment of the present invention has a latch 1 for holding a target address used for a preceding access, a comparator 2 for comparing a target address for access presently conducted and the target address for the preceding access held by the latch 1, a RAS/CAS generator 3 for providing row address strobe (RAS) signal/column address strobe (CAS) signal to a DRAM based on access information (a) and a comparison result signal (b) from the comparator 2, a multiplexer 4 for generating (multiplexing) a row address and a column address from an access address (c), a MISC controller 5 for controlling the DRAM by using access information (a) on a read or write, access size, etc. with respect to operations other than that effected by the RAS/CAS generator 3, and a DRAM array 6 having a block transfer function and composed of a plurality of DRAMs. A reference character (d) designates data exchanged between this memory access controller and a processor.

Figure 2:
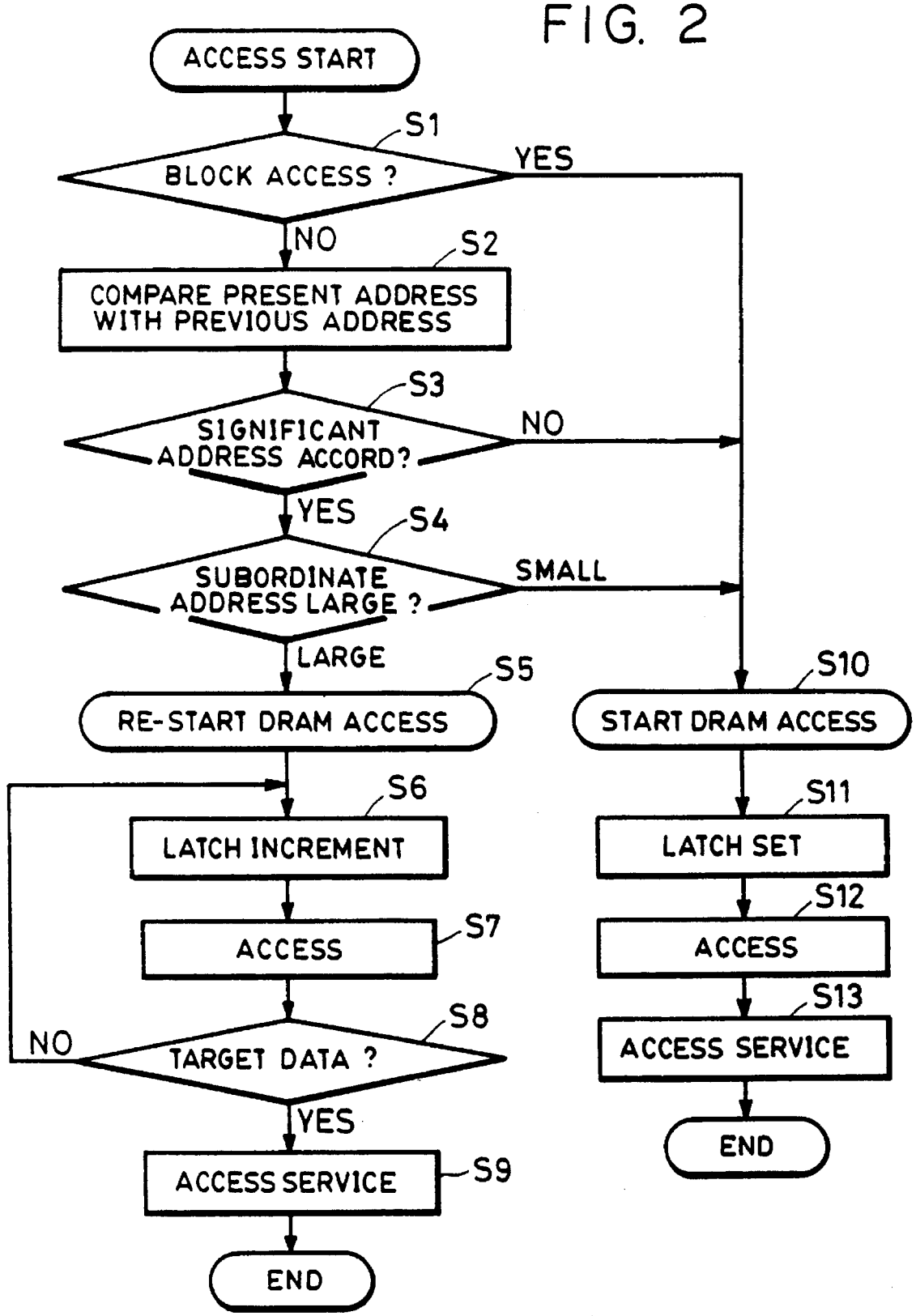
FIG. 2 is a flowchart of a memory access operation in accordance with the embodiment.

FIG. 2 is a flow chart of the operation of the memory access controller shown in FIG. 1. When a processing unit (not shown) constituting the memory access controller starts accessing the memory, a determination is made as to whether the present access is a block access (step S1). If not a block access, the address held by the latch t1 and the address for the access presently conducted are compared by the comparator 2 (step S2). This comparison is made with respect to coincidence between significant address portions and the magnitude relationship between subordinate address portions (steps S3, S4). Block transfer from the DRAM is a process in which the column address (subordinate address portion) is changed (incremented) in a certain cycle while fixing the row address (significant address portion) to successively output data designated by the row and column addresses. A high access speed is thereby achieved in comparison with the ordinary access method which requires setting row and column addresses for each access. The significant address portions are compared to determine whether the row address for the present access coincides with that for the preceding access, and the subordinate address portions are compared to determine whether the present access target is positioned on an address greater than the preceding one. That is, this comparison is made to check whether the accessing using the block transfer function of the DRAM started for the preceding accessing can be continued. If the significant address portions coincide with each other while the subordinate address portion of the present access is greater than that of the address held by the latch 1, the preceding access can be continued, that is, the access to the DRAM can be restatted (step S5). The preceding block transfer can be utilized in this manner and it is thereby possible to eliminate the set-up time required for the new access. For example, accessing is performed by asserting or disasserting the RAS/CAS signal generated by the generator 3 in a case where a DRAM having a block transfer function in a nibble mode is used in the DRAM array 6, or by asserting or disasserting the CAS signal generated by the generator 3 while incrementing the column address given to the DRAM array 6 from the row address/column address multiplexer 4 in accordance with the assertion of the CAS signal in a case where a DRAM having a block transfer function in a high-speed page mode is used in the DRAM array 6. Asserting/disasserting the CAS signal is performed a number of times corresponding to the difference between the address of the access target and the address held by the latch 1 before the start of the present access. The content of the latch 1 is incremented simultaneously with the assertion/disassertion of the CAS signal (step S6). The access target in the DRAM array 6 is addressed by repeatedly asserting/disasserting the CAS signal the number of times mentioned above (steps S6 to S8), and a service related to the access is effected (step S9). After the completion of the service, the RAS signal is in the asserted state while the CAS signal is in the disasserted state, that is, the DRAM is in an access-suspended state. If it is determined that the access is a block access (access to a cacheable area) (step S1), the significant address portions do not coincide with each other at the time of address comparison (step S3), or that the present access target is positioned on an address less than the preceding one (step S4), access to the DRAM is newly started (step S10). In each case, access using the block transfer function of the DRAM is effected; new DRAM access is started by temporarily disasserting the RAS signal generated by the RAS/CAS generator 3. In the case of a block access, the most significant address of the block presently accessed is set in the latch 1 for the next access. In the case of access other than block access, the address of the present target data is set in the latch 1 for the next access (step S11). Thus, the block transfer function is used even if the present access is not a block access, so that the set-up time at the time of next access may be eliminated to reduce the access time. When the service related to the access is completed (step S12, S13), the RAS signal is set in the asserted state while the CAS signal is set in the disasserted state.

As described above, in a system having a memory unit using a memory for a block transfer function, access using the block transfer function is performed if block transfer is possible even though the memory access designated by the processor is not a block access. Chances of block access can therefore be increased so that the time taken for accessing is reduced. This system eliminates the need to add a large-scale hardware means as in the case of a method of using a buffer. Also the speed of access to cacheable and uncacheable areas is increased in comparison with the conventional system. The method of the present invention eliminates the possibility that even data which may originally be placed in an uncacheable area is placed in a cacheable area to frequently cause data block replacements in the cache memory and a reduction in the hit rate of the cache memory.

While the present invention has been described with respect to what presently are considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A memory access control method comprising the steps of:

receiving address data of an access request;

discriminating whether a row address of the received address data accords with a row address of preceding access address data held in a latch;

discriminating whether a column address of the received address data is greater than a column address of the preceding access address data held in the latch;

successively incrementing a column address of an access address to a memory in a predetermined cycle, from the column address of the preceding address up to the column address of the received address data, and fixing a row address of the access address as the row address of the preceding access address if the row address of the received address data is determined to accord with the row address of the preceding access address data and if the column address of the received address data is determined to be greater than the column address of the preceding access address data, as results obtained in said discriminating steps;

successively performing access to the memory with the access address each time the column address of the access address is incremented in said incrementing step; and updating the access address data held in the latch by the access address each time the column address of the access address is incremented in said incrementing step.

2. A method according to claim 1, further comprising a step of asserting a row address strobe and disasserting a column address strobe after performing the access to the memory.

3. A method according to claim 1, wherein update of the address data held in the latch is executed each time the access address to the memory is incremented.

4. An information processing system comprising:

memory means for storing information;

reception means for receiving address data on a requested access to said memory means;

address memory means for storing address data used for a preceding access;

discriminating means for discriminating whether a row address of the address data received by said reception means accords with a row address of the preceding access stored in said address memory means and discriminating whether a column address of the address data received by said reception means is greater than a column address of the preceding access stored in said address memory means;

increment means for successively incrementing a column address of an access address to said memory means in a predetermined cycle, from the column address of the preceding address up to the column address of the address data received by said reception means, and fixing a row address of the access address as the row address of the preceding access address if the row address of the received address data is determined to accord with the row address of the preceding access and if the column address of the received address data is determined to be greater than the column address of the preceding access, as results obtained by said discriminating means;

access means for successively performing access to said memory means with the access address each time the column address of the access address is incremented by said increment means; and update means for updating address data stored in said address memory means by the access address each time the column address of the access address is incremented by said increment means.

5. A system according to claim 4, further comprising control means for asserting a row address strobe and disasserting a column address strobe after said access means performs the access to said memory means.

6. A system according to claim 4, wherein the updating of the address stored in said address memory means by said update means is executed each time said increment means increments the access address to said memory means.

* * * * *